J. Harris.
Gang-Plow.

No. 71,301

Patented Nov. 26, 1867.

Witnesses
J. H. Atkinson
L. R. Townsend

Inventor
James Harris

United States Patent Office.

JAMES HARRIS, OF SANTA CLARA COUNTY, CALIFORNIA.

Letters Patent No. 71,301, dated November 26, 1867.

IMPROVEMENT IN GANG-PLOUGHS.

The Schedule referred to in these Letters Patent and making part of the same.

KNOW ALL MEN BY THESE PRESENTS:

That I, JAMES HARRIS, of the county of Santa Clara, State of California, have made and invented a new and useful Improvement in Gang-Ploughs, of which the following, together with the accompanying drawings, is a clear and exact description.

The purposes of my invention are to make a gang-plough of two or more ploughs, possessing all the strength, lightness, durability, ease of operation, and convenience of working of the ordinary plough, with the capacity to perform double or treble the amount of work within the same time. I have also aimed to combine in this plough a system of adjustability by which the plough can be operated by the most ordinary hand or boy-labor; also to so arrange the parts that the plough can be thrown out or in the ground by the motion of the bar E, in a similar manner to the old mode with the single plough. The arrangement of the draught-chains attached to the gauge-screws K K, to give more or less land, is admirably adapted to the purposes sought.

In constructing gang-ploughs there has always been a stiffness in their working, a complication of arrangements to operate them, without accomplishing the adaptability to enter and leave the ground with the ease of the old single plough; and there being no arrangement to elevate or lower one plough above another, no adjustment was possible on sideling ground, a desideratum this plough is intended to obtain. From the experiments made, and practical working of this plough, I do not hesitate to say it is not surpassed by any plough yet arranged for the purposes intended.

The side beam B, to which is attached the arm C, may be made of iron, and form the socket for the rocking bar, and the arm C be dispensed with, and the lowering or hoisting set that was accomplished by the arms may be effected by the plough-stand passing through a head-piece that may be fastened to the rocking bar, or the arms may be fastened to the iron beam just as to the wood. The adjustable seat may be set so as to regulate the weight of the driver to the condition of the soil and the working of the plough. The arrangement of the ploughs to the rocking bar is effected by a head-piece, set-screw, pin, or their equivalents. The set of the plough in the ground by the regulating-screw J, dispenses with the necessity of a land-side, producing a smooth and clean furrow. By removing the pin that fastens the lever to the rocking bar, the ploughs may be turned up and over upon the frame behind the driving-seat, thereby placing them beyond accident in driving to and from the field.

Figure 1:
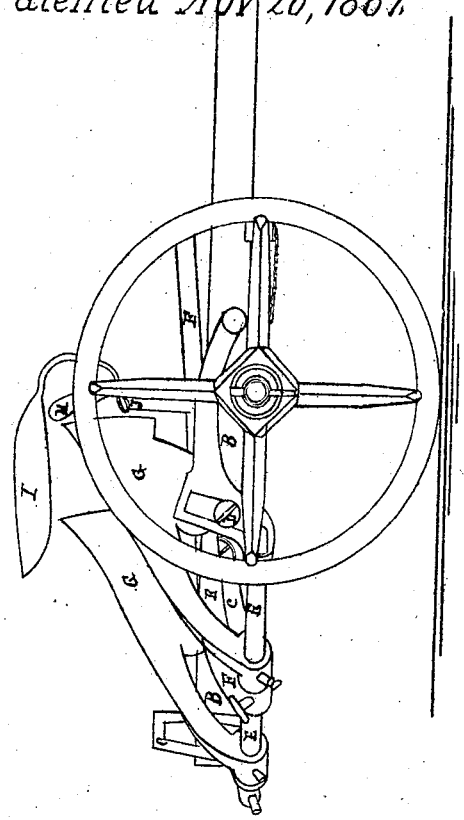

Figure 1 is a side view for work.

Figure 2:
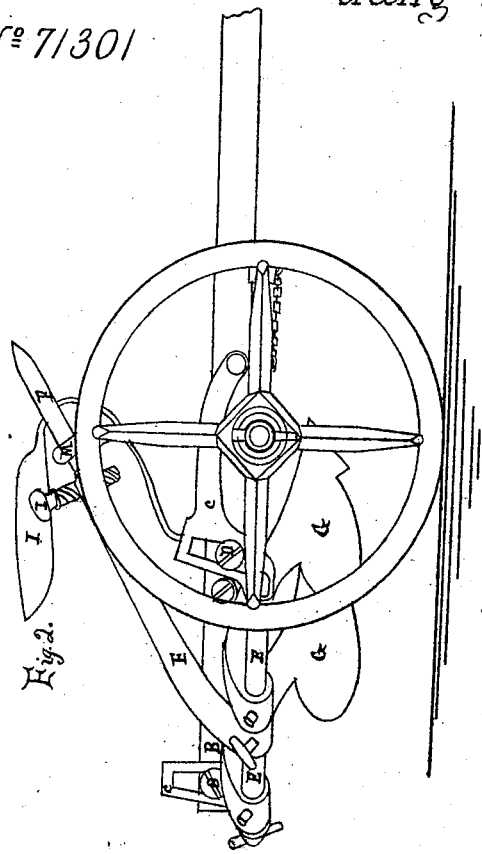

Figure 2, side with ploughs out of ground.

Figure 3, top view.

Figure 4:
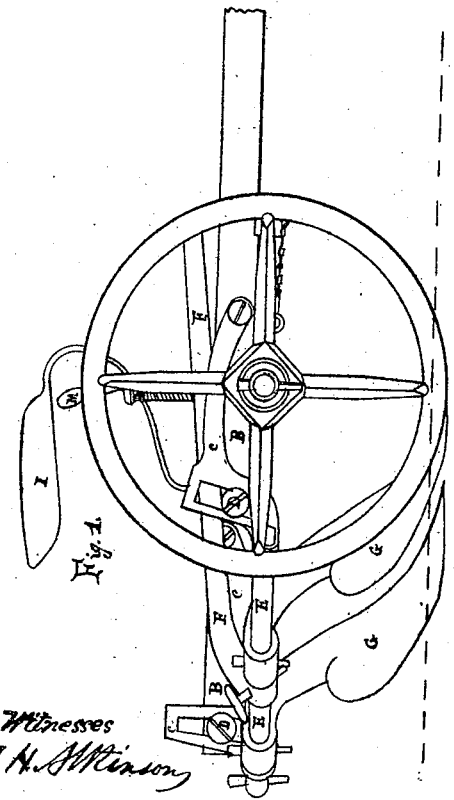
Figure 3:
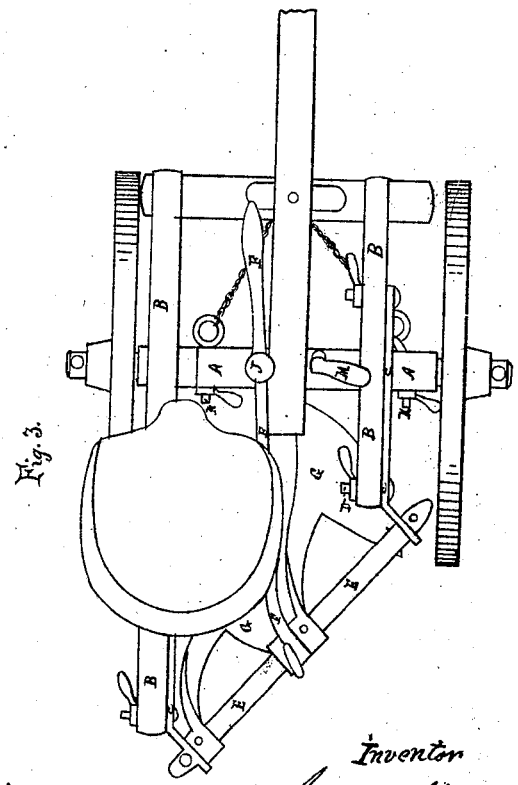

Figure 4, ready for travelling.

A is the axle; B B the beams; C C, two arms; D D, screw to elevate or lower the arms; E the rocking bar, to which the ploughs are attached; F is the elevating lever, to lower and hoist the ploughs; G are the ploughs; I, adjustable seat; J, gauge-screw, to regulate the depth; K K are the two screws attached to the chains to regulate the size of the furrow; M is the lever-rest.

*Claim.*

I claim—

1. The rocking bar E, to which the ploughs are attached, and by which they are turned over upon the frame.

2. The elevating lever F, the adjustable seat I, the gauge-screw J, the adjusting-screws K K, the lever-rest M, in combination, with the rocking bar E, as described, and substantially as set forth.

San Francisco, July 9, 1867.

JAMES HARRIS.

Witnesses:
J. H. ATKINSON,
J. B. WINGARD.